Nov. 13, 1934.  C. S. KILE  1,980,533
DENTAL MIXING SLAB
Original Filed June 27, 1932
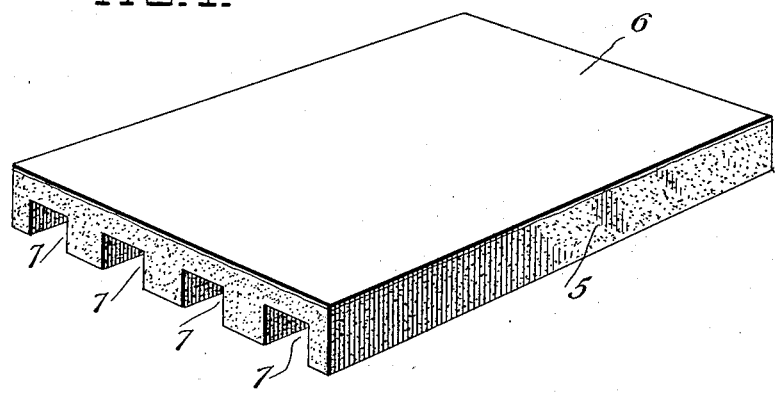
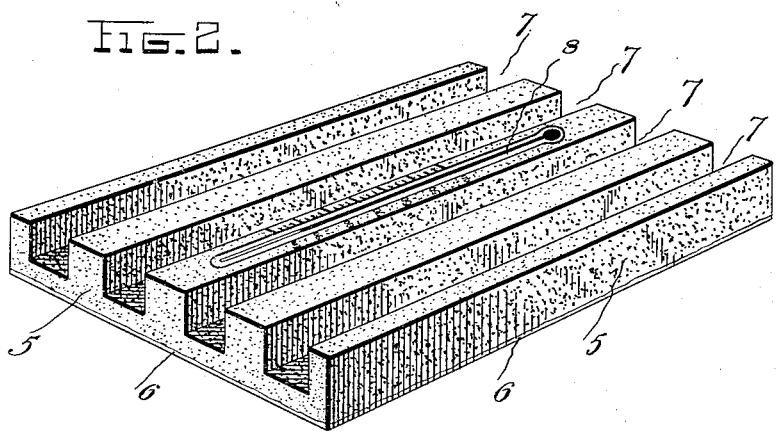
Inventor
Clifford S. Kile Patented Nov. 13, 1934

1,980,533

UNITED STATES PATENT OFFICE 1,980,533

DENTAL MIXING SLAB

Clifford S. Kile, Hutchinson, Kans.

Application June 27, 1932, Serial No. 619,595
Renewed April 10, 1934

4 Claims. (Cl. 32—39)

The invention relates to slabs used in dental laboratories and the like, upon which to mix dental cement, and it aims to provide a new and improved slab in which provision is made to effect slab-cooling by natural evaporation of water, insuring that the slab temperature will be lower than the laboratory temperature, with the usual advantage of obtaining a more uniform mix.

With the foregoing in view, the invention resides in the novel subject matter hereinafter described and claimed, description being accomplished by reference to the accompanying drawing.

Figs. 1 and 2 are perspective views of a mixing slab constructed in accordance with my invention, the latter view being inverted.

The major portion 5 of the slab is of porous material to readily absorb water, but such slab is provided with an upper minor portion 6 which is impervious to water and constitutes a working surface upon which to mix the usual cement powder and liquid. By saturating the porous slab portion 5 with water (or other preferred liquid) before using the slab, the natural evaporation of the liquid effectively cools the slab, maintaining it at an advantageous temperature. To facilitate such evaporation of the liquid, the slab is preferably channeled for air circulation, and in the preferred structure, the lower side of said slab is formed with a plurality of parallel channels 7 through which air may readily pass to assist in evaporating the liquid.

The slab portion 5 is preferably monolithic and may well be formed from porous earthenware or the like, and the portion 6 may well be formed by glazing or by baking enamel upon said portion 5.

By providing the novel slab shown and described, effective cooling and hence thorough mixing are insured, even in extremely hot weather. To assist in determining when the slab is at about the proper temperature for use, a thermometer 8 is preferably embedded in a portion of said slab, and while said thermometer is shown at the lower side of the slab, it might well be otherwise located.

I claim:—

1. A dental mixing slab comprising a major portion of porous material to absorb water and allow evaporation of said water to cool the slab, and a minor portion impervious to water and disposed at the upper side of the slab to provide a working surface.

2. A dental mixing slab comprising a major portion of porous material to absorb water, and a minor portion impervious to water and disposed at the upper side of the slab to provide a working surface, said porous major portion being channeled for air circulation to effect evaporation of the water therefrom to facilitate cooling of the slab.

3. A monolithic dental mixing slab of porous nature to absorb water and allow evaporation of said water to cool the slab, but having a smooth water-impervious upper side providing a working surface.

4. A monolithic dental mixing slab of porous nature to absorb water, but having a smooth water-impervious upper side providing a working surface, said slab being channeled for air circulation to effect evaporation of the water therefrom to facilitate cooling of the slab.

CLIFFORD S. KILE.